(12) United States Patent
Watanabe

(10) Patent No.: US 10,209,457 B2
(45) Date of Patent: Feb. 19, 2019

(54) PROTECTION CAP FOR OPTICAL CONNECTOR PLUG

(71) Applicant: SANWA DENKI KOGYO CO., LTD., Tokyo (JP)

(72) Inventor: Yasuhiro Watanabe, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 6 days.

(21) Appl. No.: 15/722,008

(22) Filed: Oct. 2, 2017

(65) Prior Publication Data

US 2018/0095226 A1 Apr. 5, 2018

(30) Foreign Application Priority Data

Oct. 5, 2016 (JP) .................................. 2016-196940

(51) Int. Cl.
*G02B 6/38* (2006.01)

(52) U.S. Cl.
CPC ......... *G02B 6/3849* (2013.01); *G02B 6/3885* (2013.01); *G02B 6/387* (2013.01); *G02B 6/3821* (2013.01); *G02B 6/3893* (2013.01)

(58) Field of Classification Search
CPC ............................ G02B 6/3849; G02B 6/3885
USPC ........................................................ 385/78
See application file for complete search history.

(56) References Cited

U.S. PATENT DOCUMENTS

| 2004/0086232 A1* | 5/2004 | Fujiwara | B08B 1/008 |
| | | | 385/53 |
| 2011/0013876 A1 | 1/2011 | Marcouiller et al. | |
| 2011/0188813 A1 | 8/2011 | Marcouiller et al. | |
| 2015/0277062 A1 | 10/2015 | Xiao et al. | |

OTHER PUBLICATIONS

Search Report issued in European Patent Appln. No. 17194736.9 dated Mar. 14, 2018.

* cited by examiner

*Primary Examiner* — Jerry Blevins

(74) *Attorney, Agent, or Firm* — Bacon & Thomas, PLLC

(57) ABSTRACT

A cap main body is provided with an approximately rectangular conical occluded portion in a leading end side, an approximately rectangular tubular cover portion in an inner side of the occluded portion, and approximately rectangular tubular right and left and upper and lower side plates in a rear end side. A pair of slits are provided at upper and lower positions of the right and left side plates or right and left positions of the upper and lower side plates from an opening end of the cap main body toward an inward occluded portion so that elastic side plates are formed in a facing manner. A locking mechanism protruding out of an opening portion in a rear end of the cap main body and capable of locking to and unlocking from a spring push of the plug main body is provided in a leading end of the elastic side plates.

14 Claims, 21 Drawing Sheets

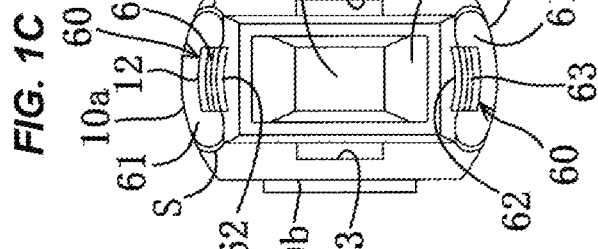
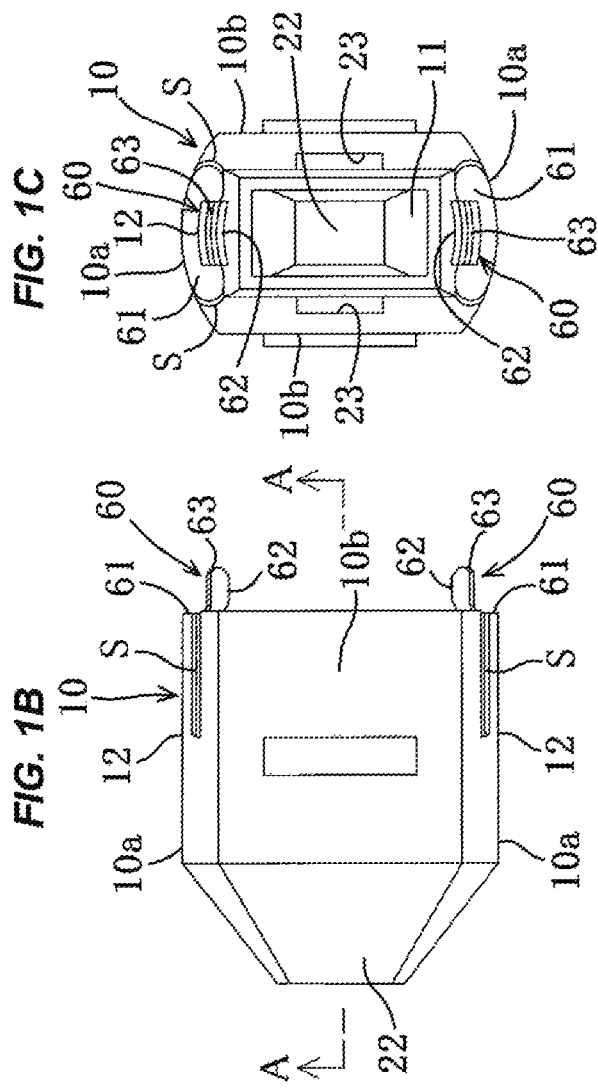
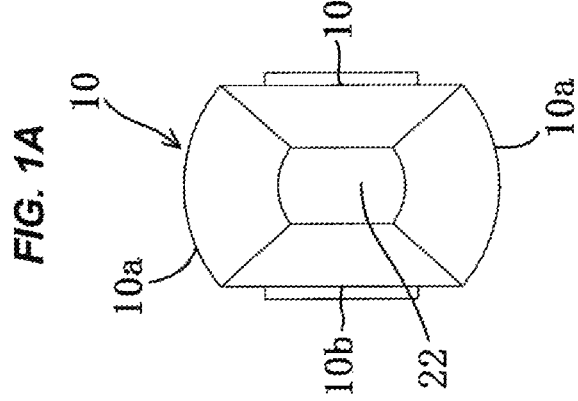
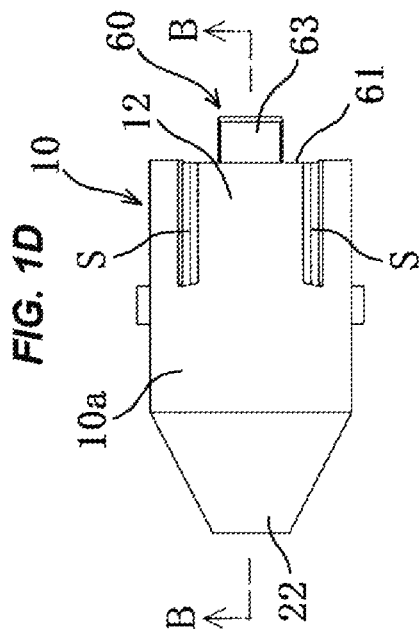

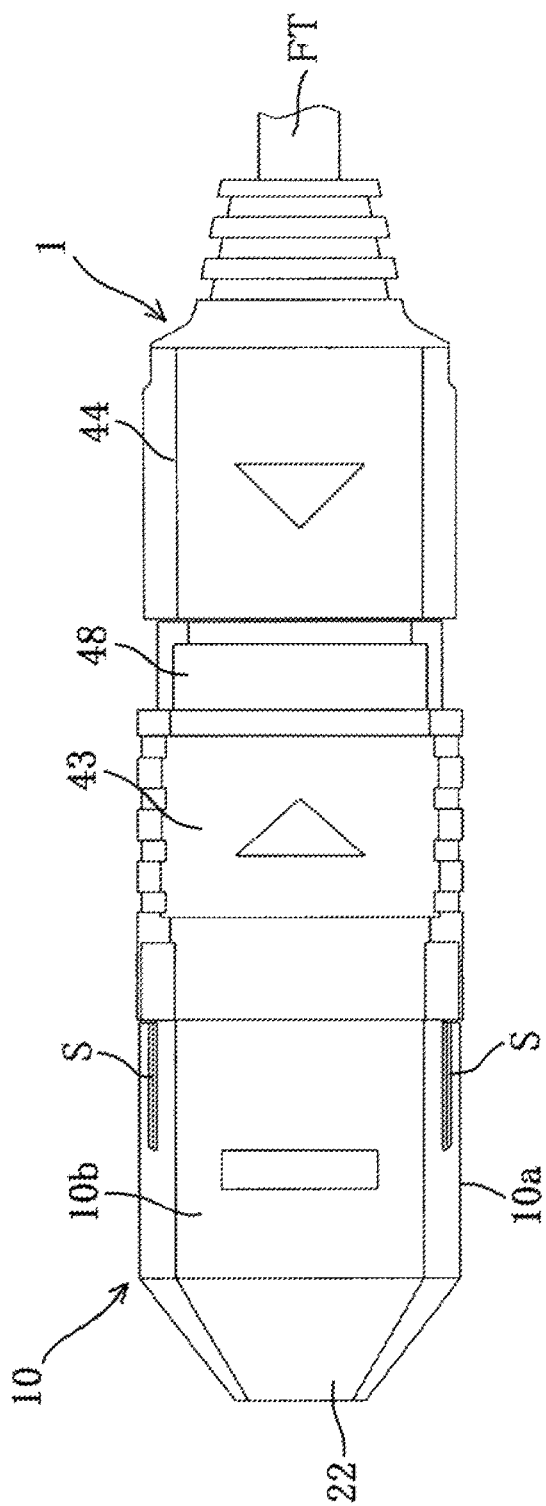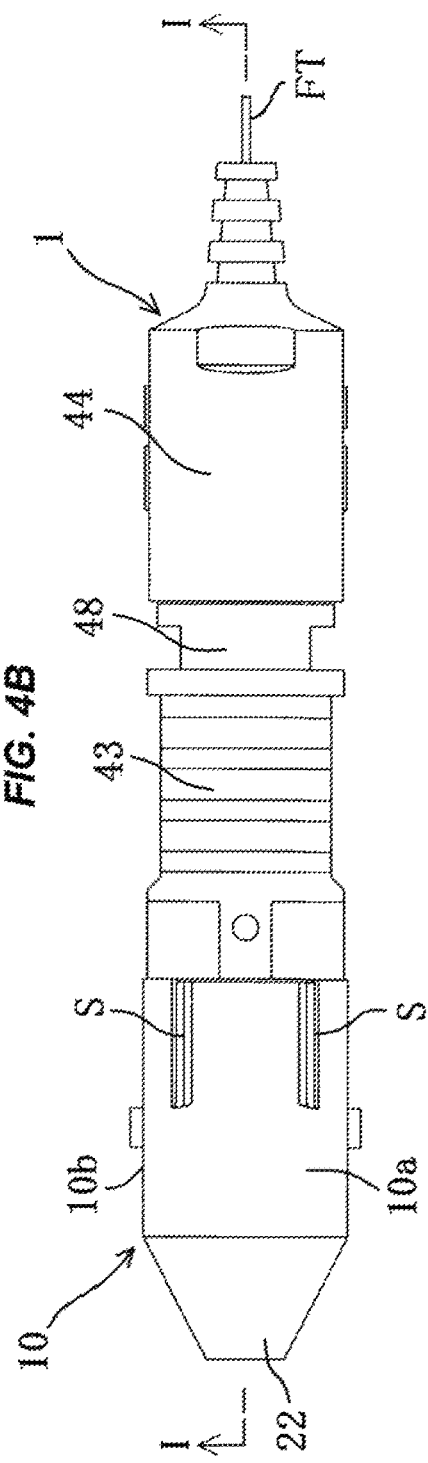

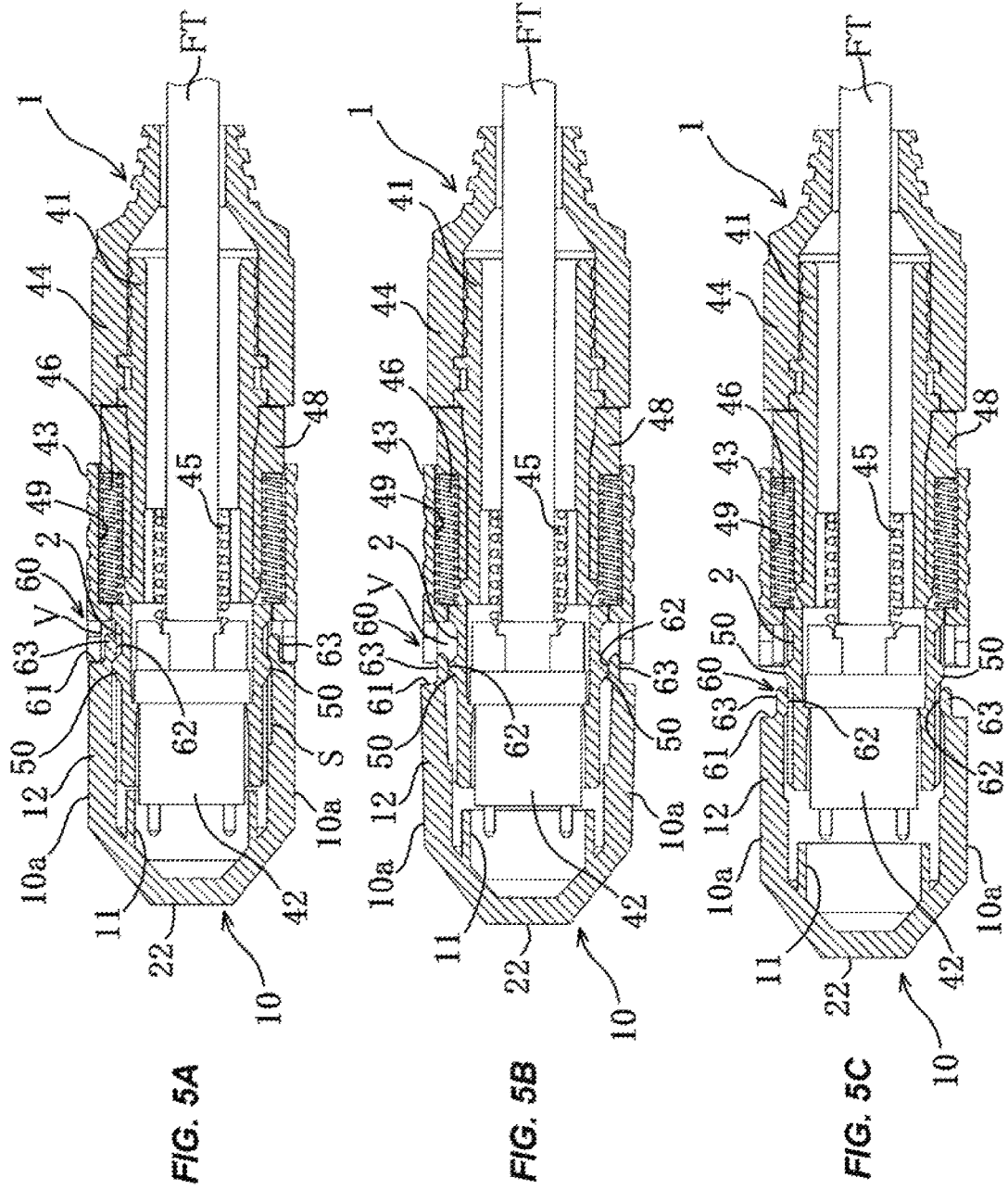

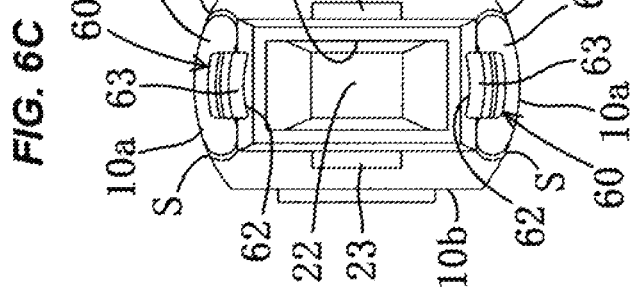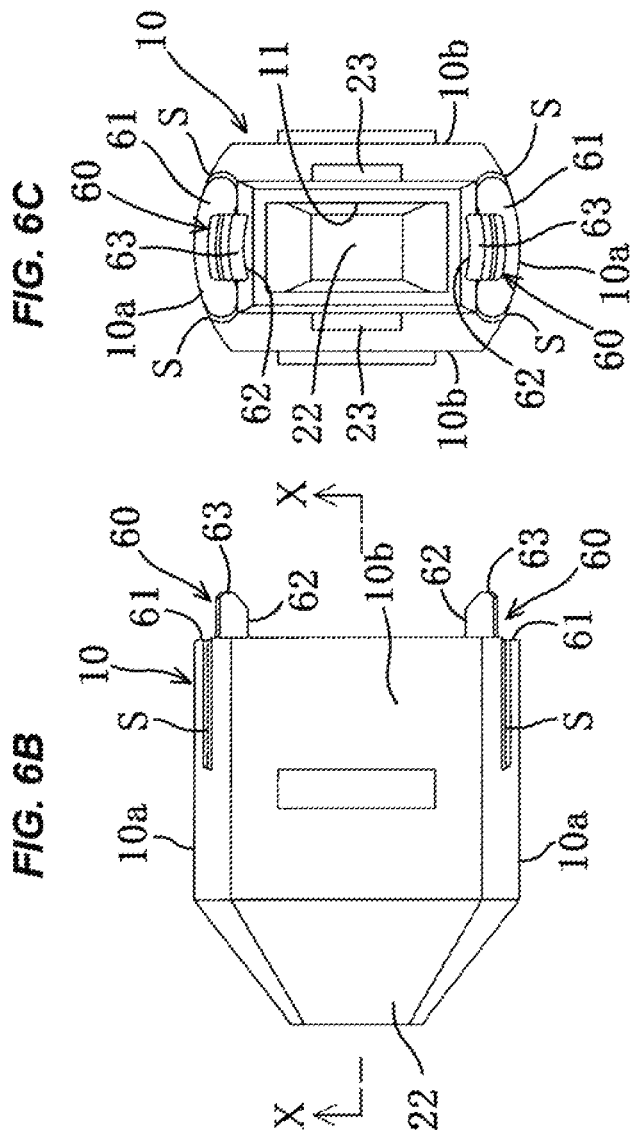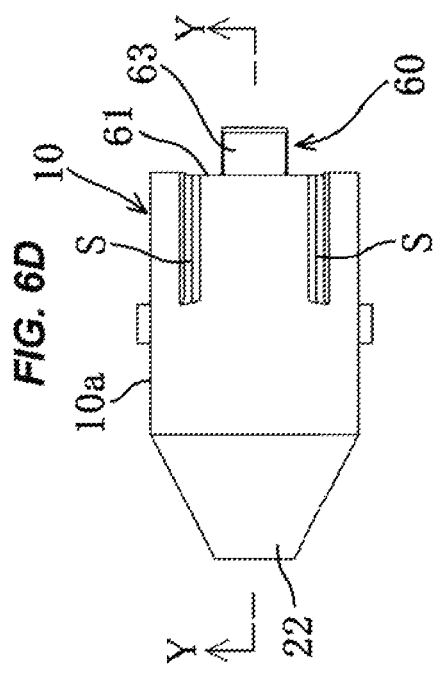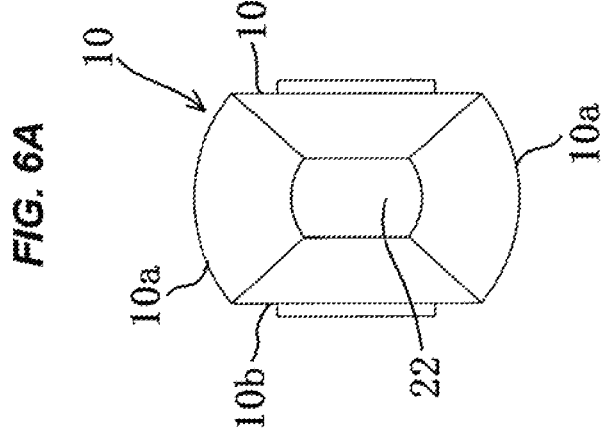

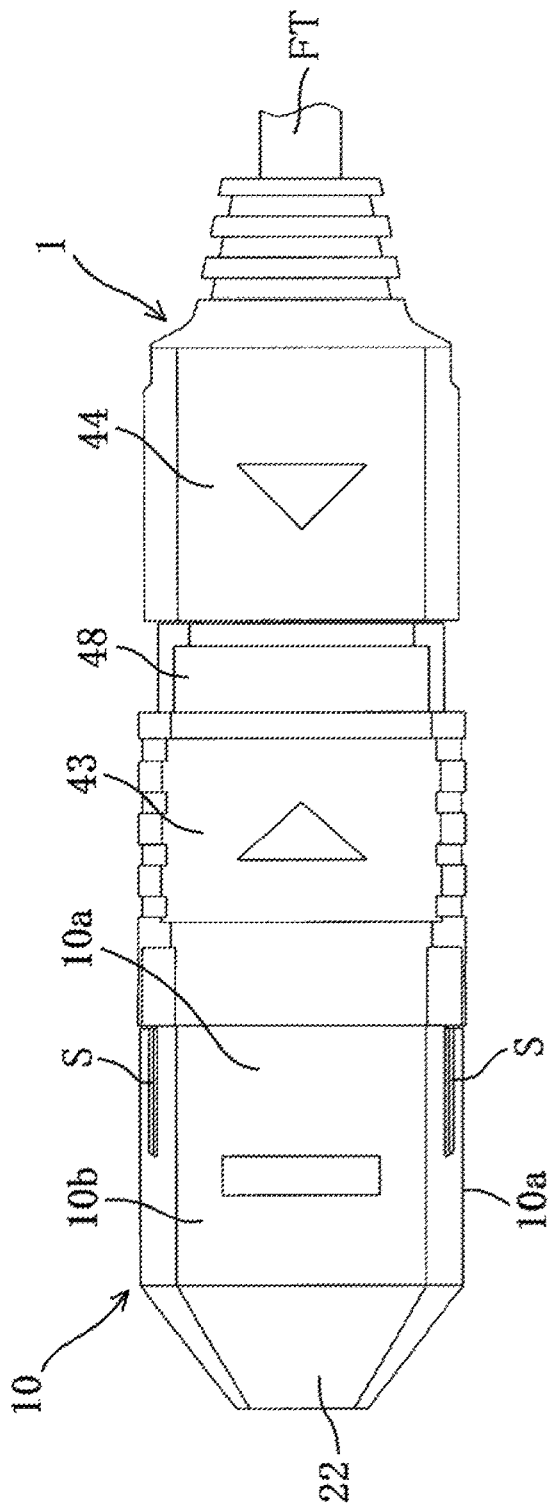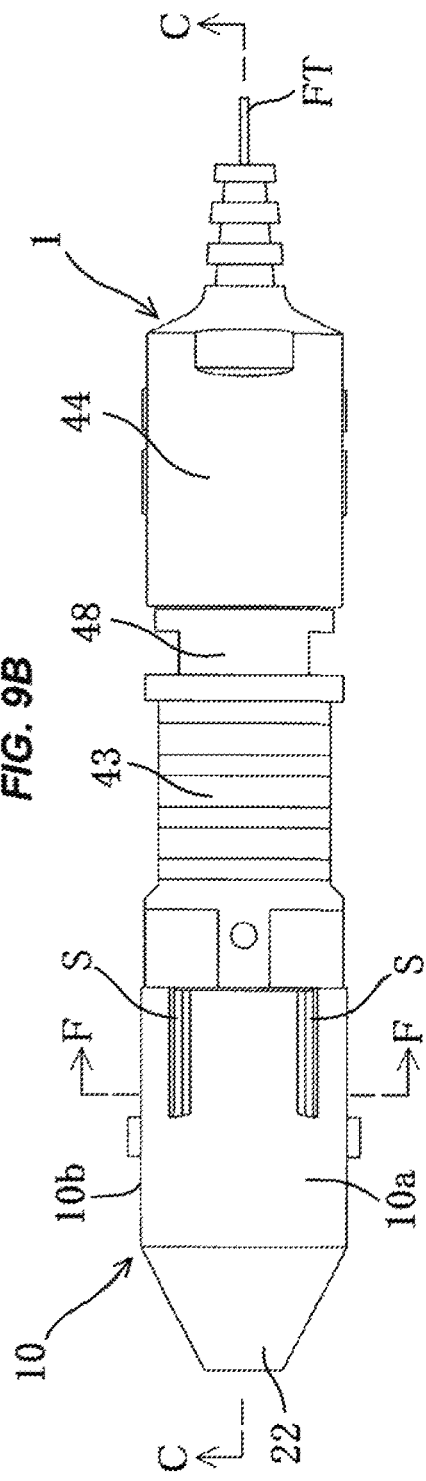

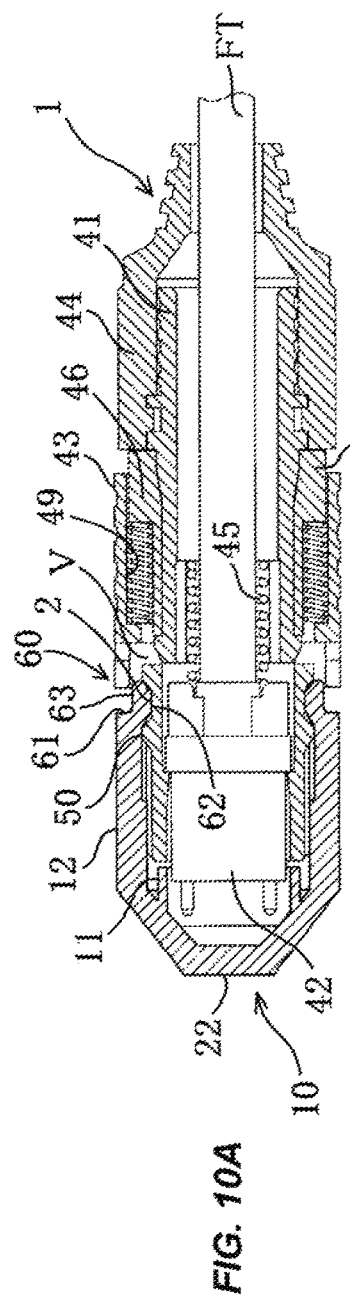
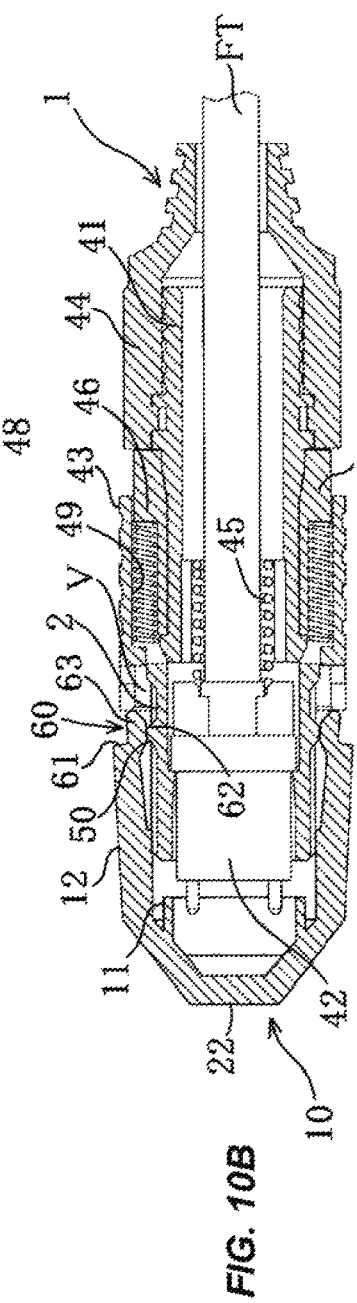
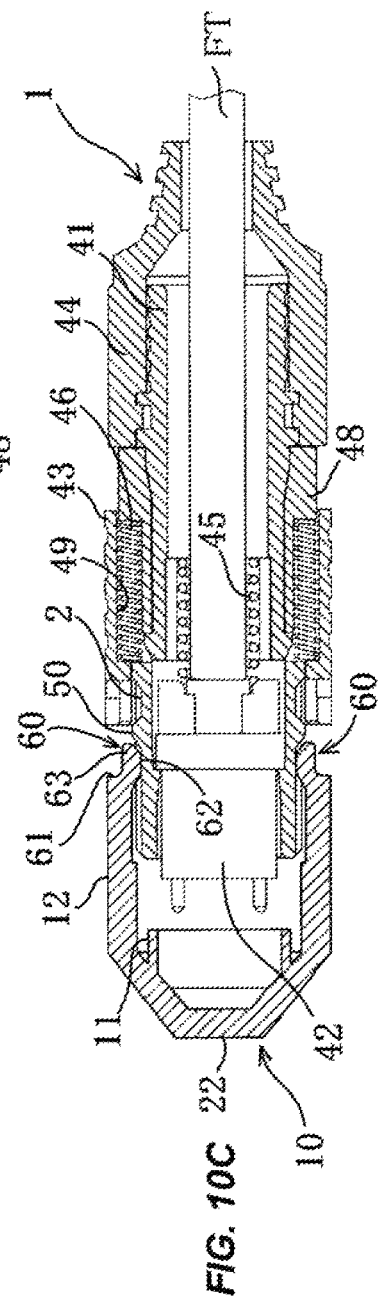
FIG. 10A
FIG. 10B
FIG. 10C

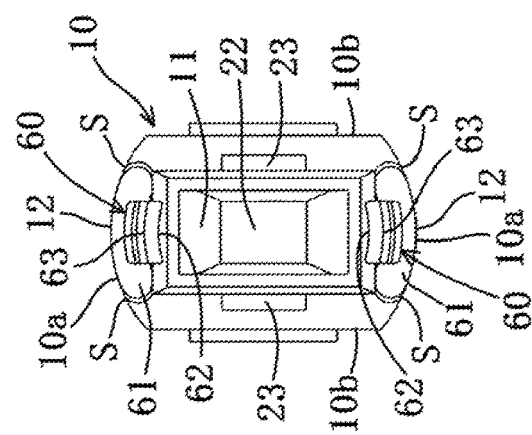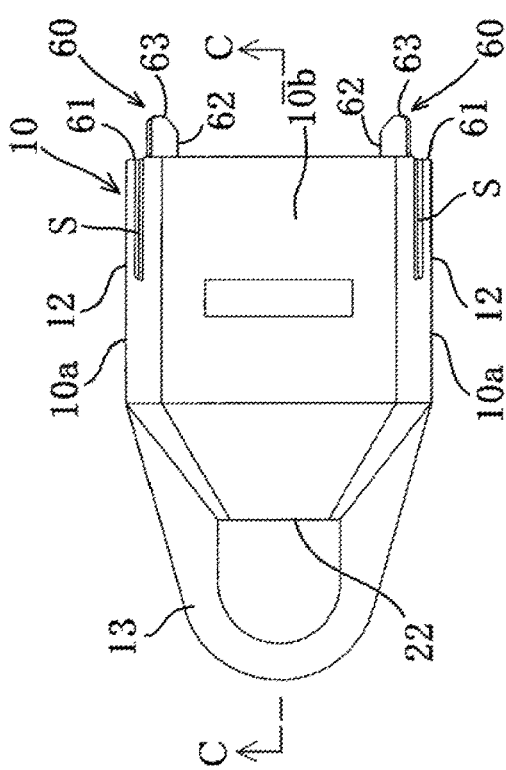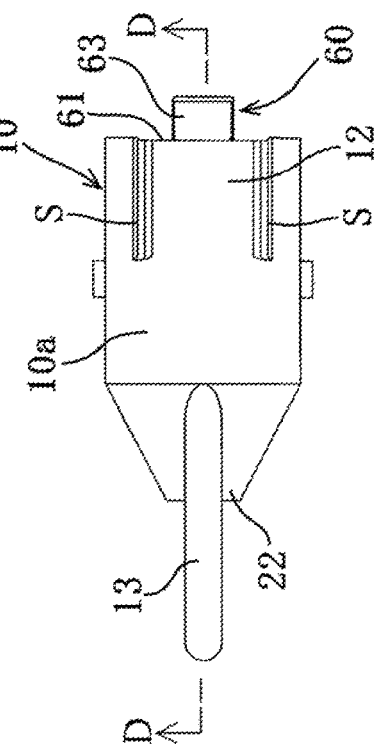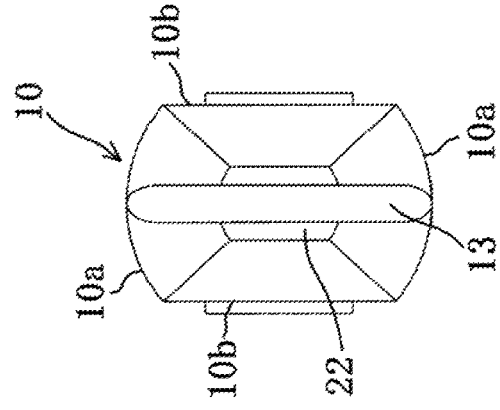

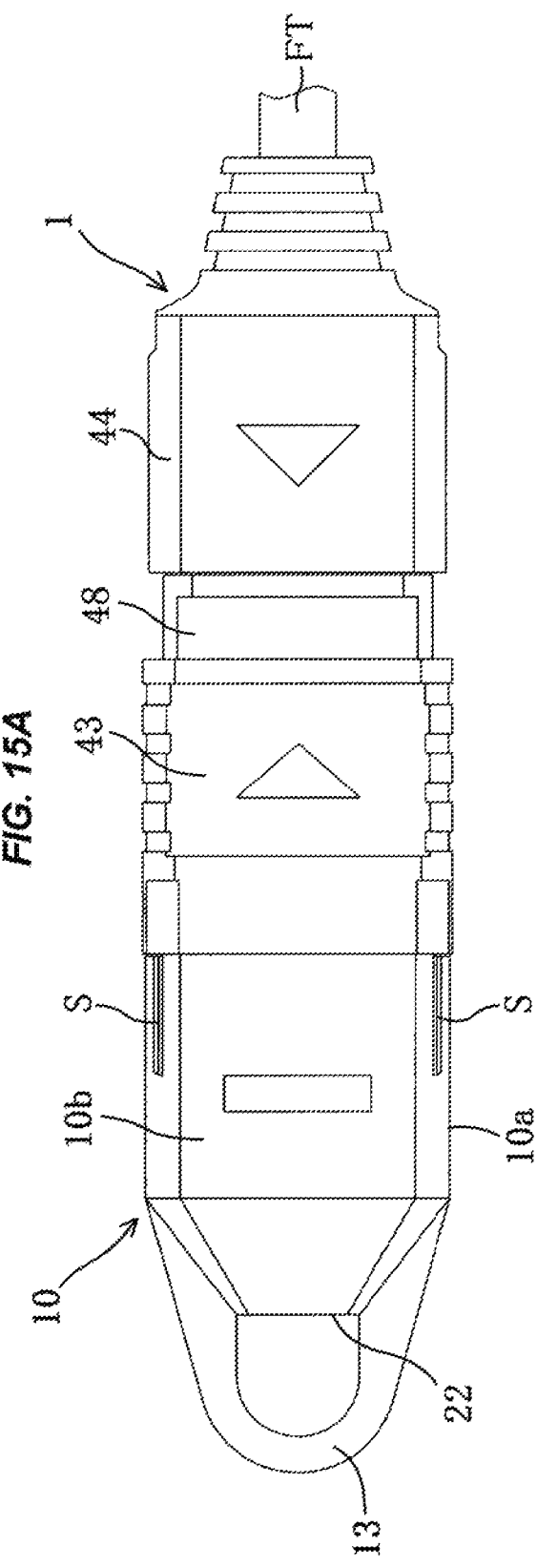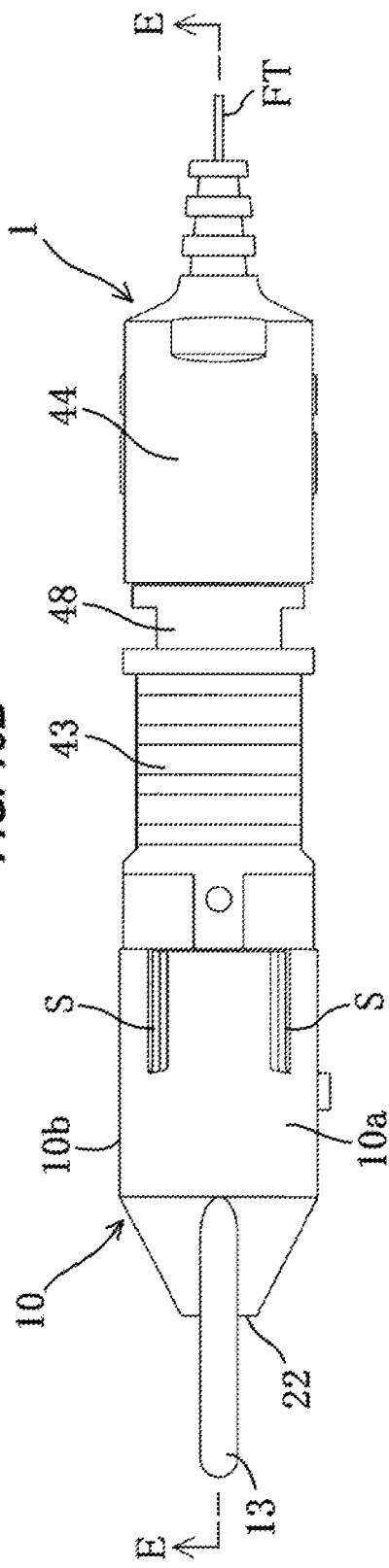

UNDERGROUND PIPING EXAMPLE

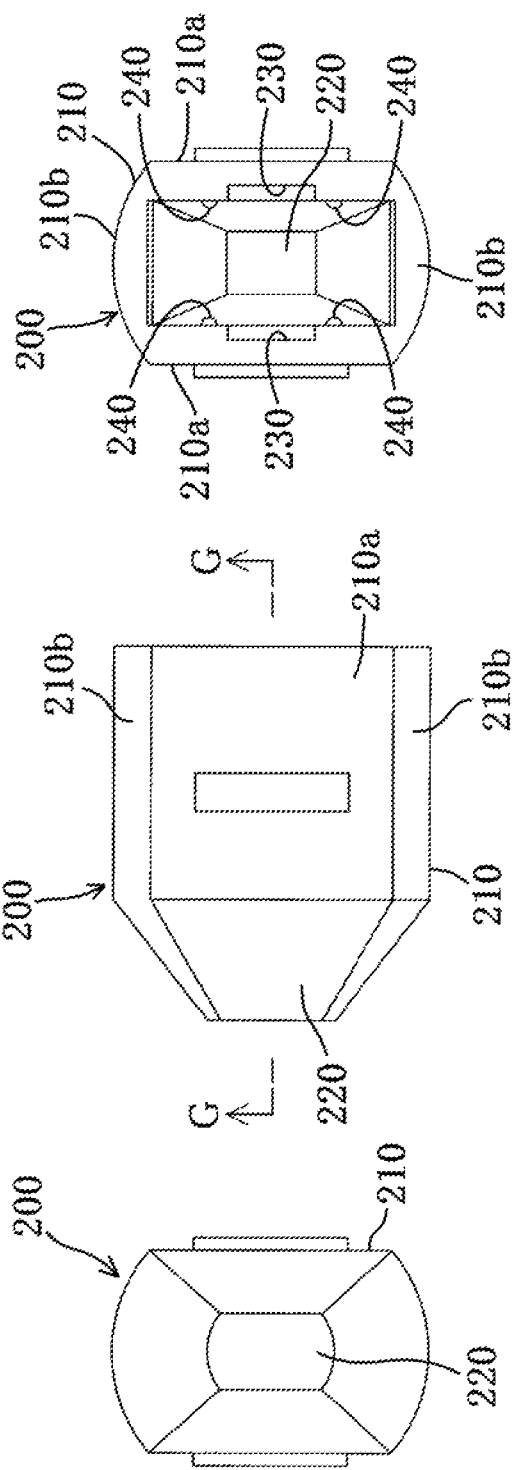

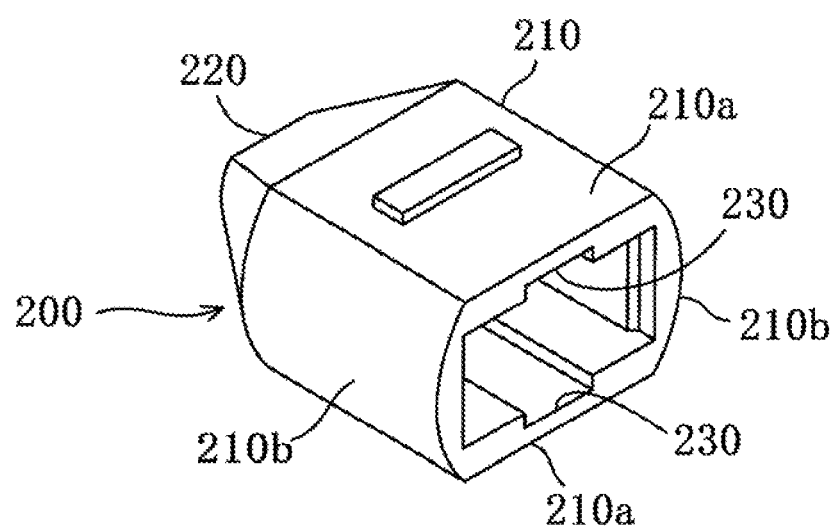

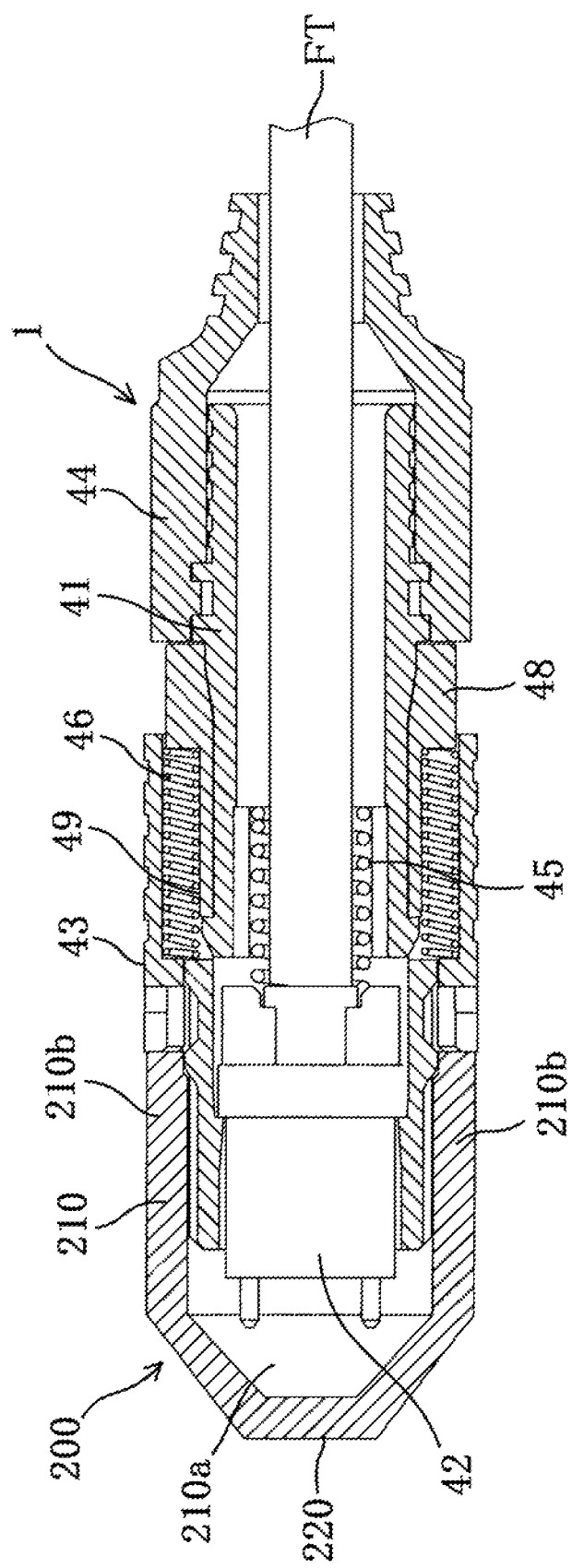

PROTECTION CAP FOR OPTICAL CONNECTOR PLUG

TECHNICAL FIELD

The present invention relates to a protection cap for an optical connector plug which can prevent dusts from being attached to a leading end portion of a ferrule of the optical connector plug according to an MPO type push-pull system, and prevent a scratch from being attached due to an external force.

BACKGROUND ART

Conventionally, a plug main body 1 constructing the MPO type optical connector plug is provided with a ferrule 42 which is attached to a leading end of an optical fiber tape core wire FT, in a leading end (a front end) within a sleeve-like spring push 41 (which may also be referred to as a push sleeve), as shown in FIG. 21. Further, a spring 45 elastically energizing the ferrule 42 to a front side of the plug main body 1 is provided within the spring push 41. Further, the plug main body is provided with a tubular coupling 43 which is outward inserted to a concave part 49 of a housing 48 which is outward fitted to the spring push 41, is provided so as to be slidable in relation to the spring push 41 in a movable range which is secured in an axial direction thereof and is elastically energized to a front side of the plug main body 1 by the spring 46, and a boot 44 which is outward inserted to a rear end portion in an opposite side to a front end where the ferrule 42 of the spring push 41 is provided.

The insertion of the plug main body 1 into an adapter (not shown) is performed by pressing a portion which is positioned in a rear side from the coupling 43 in the plug main body 1, for example, the boot 44 toward the adapter (not shown) with a worker's finger. On the other hand, the detachment of the plug main body 1 from the adapter (not shown) is performed by pulling in the coupling 43 to the spring push 41 side against the elastic energizing force of the spring 46.

Here, a protection cap 200 is used for preventing the scratch from being attached to the leading end side of the ferrule 42 due to the dusts and the external force. More specifically, the protection cap 200 is formed by a cap main body 210 which is constructed by wide upper and lower side plate portions 210a and narrow right and left side plate portions 210b and is formed into an approximately flat rectangular tubular shape in an opening portion, as shown in FIGS. 18A, 18B, 18D, 19, 20A and 20B, and a leading end portion of the cap main body 210 forms an occluded portion 220 which is formed into an approximately flat conical shape so as to surround the ferrule 42. Further, a pair of key grooves 230 are formed in upper and lower symmetrical surfaces within the cap main body 210 for introducing and guiding a key projection (not shown) which is formed on an outer surface in a leading end (a front end) of the spring push 41.

The protection cap 200 is put on the leading end portion (the front end portion) of the spring push 41 and covers the leading end portion as shown in FIG. 21. In this case, the key projection of the spring push 41 is introduced and guided along the key groove 230 of the cam main body 210, and is locked by the leading end portion of the coupling 43.

Further, as shown in FIG. 18C, upper and lower pairs of ribs 240 which face laterally and are totally four ribs are formed in an inner wall surface of the wide side plate portion 210a in the cap main body 210, and the leading end portion of the spring push 41 is locked and retained by the ribs 240.

Further, patent document 1 conventionally discloses a dust cap in which an elastic locking piece is built therein. More specifically, in the dust cap, a pair of elastic latches positioned in an opposite side of the center axis include a cantilever arm portion which extends to a cantilever end portion from a base table of a sleeve (a cap main body), the arm portion extends to an open end from a closed end, and a groove portion is formed in a cavity of the sleeve (the cap main body) and forms a boundary portion of the cantilever arm portion.

CITATION LIST

Patent Document

Patent Document 1: US Patent Application Publication No. 2011/188813

SUMMARY OF THE INVENTION

Problem to be Solved by the Invention

However, the conventional protection cap 200 is simply put on the leading end portion (the front end portion) of the spring push 41, and the protection cap 200 is not provided with any locking mechanism for the spring push 41. As a result, there has been fear that the protection cap 200 is carelessly detached during use or at the transferring time of the plug main body 1.

Further, as shown in FIG. 18C, in the case that a plurality of ribs 240 are formed in an inner wall of the cap main body 210 and the protection cap 200 is retained by being press fitted to the plug main body 1 side via the ribs 240, as a countermeasure for preventing the protection cap 200 from falling away, an outer surface of the leading end portion of the spring push 41 is rubbed by a plurality of ribs 240, and there has been fear that the scratch caused by the ribs 240 is attached to the plug main body 1 itself.

Further, in the case of the patent document 1 mentioned above, a pair of elastic latches forming a boundary portion of the cantilever arm portion by the groove portion formed in the cavity of the sleeve (the cap main body) extend from the closed end to the open end at a predetermined interval within the cavity of the sleeve (the cap main body), so-called a type having the elastic latches built-in. Accordingly, the protection cap is additionally provided separately from four surfaces of the sleeve (the cap main body) of the dust cap. In other words, the structure of the dust cap itself is complicated and bulky, and a manufacturing cost thereof becomes high. Further, since the leading end of the ferrule is exposed without being covered in the closed end within the cavity of the sleeve (the cap main body), there is fear that the prevention of the dusts from entering into the leading end side of the ferrule from the open end side can not be sufficiently secured and maintained.

Consequently, the present invention is made by taking into consideration the conventionally existing various circumstances as mentioned above, and an object of the present invention is to provide a protection cap for an optical connector plug which can previously prevent the protection cap from being carelessly detached during the use or at the transferring time of the plug main body, can sufficiently secure and maintain the prevention of the dusts from entering into the leading end side of the ferrule, does not require formation of the rib which may apply the scratch to the plug main body, can simplify the structure and can be manufactured at a low cost and with a compact size.

Means for Solving Problem

In order to solve the problem mentioned above, according to the present invention, there is provided a protection cap for an optical connector plug, the protection cap covering a leading end side of a ferrule of a plug main body, the plug main body comprising:

the ferrule which is attached to a leading end of an optical fiber taper core wire;

a sleeve-like spring push which stores the ferrule in a leading end;

a housing which is installed to an outer periphery of the spring push;

a tubular coupling which is outward inserted to the housing and is provided so as to be slidable in a movable range secured in an axial direction of the spring push;

a spring which is stored in an inner portion of the spring push and elastically energizes the ferrule to a front side of the optical connector;

a spring which is stored in a concave part between the coupling and the housing and elastically energizes the coupling to the front side of the housing; and a boot which is attached to an opposite rear end portion to a front end where the ferrule of the spring push is provided, wherein the protection cap is constructed by a cap main body having a leading end side formed by an occluded portion which is formed into an truncated approximately rectangular pyramidal shape, and a rear end side formed by right and left side plates and upper and lower side plates and formed into an approximately rectangular tubular shape so that the ferrule of the plug main body is stored from a rear end opening portion, and wherein a pair of slits are provided at upper and lower positions of the right and left side plates or right and left positions of the upper and lower side plates of the cap main body from an opening end of the cap main body toward an inward occluded portion so that the side plates having elasticity are formed so as to face to each other, a locking mechanism protruding out of an opening portion in a rear end of the cap main body and capable of locking to and unlocking from the spring push of the plug main body is formed in a leading end of the elastic side plates, the cap main body is occluded on the plug main body, and a cover portion having an approximately rectangular tubular shape is formed in an inner side of the occluded portion of the cap main body so that a ferrule end surface of the plug main body is locked and retained in a non-contact state when the locking mechanism is locked to the spring push.

The locking mechanism is provided with a vertical contact surface portion which is formed above the leading end of the elastic side plate and comes close to and away from the leading end of the coupling of the plug main body, and a locking portion which is provided in a protruding manner below the leading end of the elastic side plate and inward inserted into a space portion formed in the coupling of the plug main body and the leading end of the spring push.

The locking portion is formed into a flat surface so as to slide on an inner surface of the coupling leading end of the plug main body in its upper surface, and is formed in a lower surface a locking projection locking to and unlocking from a locking convex portion which is provided in a protruding manner in a leading end of the spring push of the plug main body.

The locking portion is formed into a thin plate shape so that a locking projection formed in a lower surface thereof is locked to a portion near the upper portion of the locking convex portion which is provided in a protruding manner in the leading end of the spring push.

The locking portion is formed into a thick plate shape so that a locking projection formed in a lower surface thereof is locked to a lower portion of a locking convex portion which is provided in a protruding manner in the leading end of the spring push.

The slit provided in the cap main body is formed into a narrow curved passage shape so that an outer wall surface side and an inner wall surface side of the cap main body are communicated.

A loop-like cord hanging portion for hanging a cord for pulling in a piping is formed in an outer surface in the occluded leading end side of the cap main body.

Effect of the Invention

According to the present invention, it is possible to previously prevent the cap from being carelessly detached during the use or at the transferring time of the plug main body, sufficiently secure and maintain the prevention of the dusts from entering into the leading end side of the ferrule, make the formation of the rib which may apply the scratch to the plug main body unnecessary, simplify the structure and be manufactured at the low cost and with the compact size.

The effects of the present invention will be described below while classifying every claim.

More specifically, in the present invention, the protection cap is constructed by the cap main body having the leading end side formed by the occluded portion which is formed into the truncated approximately rectangular pyramidal shape, and the rear end side formed by the right and left side plates and the upper and lower side plates and formed into the approximately rectangular tubular shape so that the ferrule of the plug main body is stored from the rear end opening portion, and a pair of slits are provided at the upper and lower positions of the right and left side plates or the right and left positions of the upper and lower side plates of the cap main body from the opening end of the cap main body toward the inner side of the occluded portion so that the side plates having elasticity are formed so as to face to each other, the locking mechanism protruding out of the opening portion in the rear end of the cap main body and capable of locking to and unlocking from the spring push of the plug main body is formed in the leading end of the elastic side plates, the cap main body is occluded on the plug main body, and the cover portion having the approximately rectangular tubular shape is formed in the inner side of the occluded portion of the cap main body so that the ferrule end surface of the plug main body is locked and retained in the non-contact state when the locking mechanism is locked to the spring push. As a result, it is possible to previously prevent the cap main body from being carelessly detached during the use or at the transferring time of the plug main body, and it is possible to sufficiently secure and maintain the prevention of the dusts from entering into the leading end side of the ferrule. Further, it is possible to make the formation of the rib in the cap main body so that the scratch is applied to the plug main body unnecessary.

Further, the locking mechanism is provided with the vertical contact surface portion which is formed above the leading end of the elastic side plate and comes close to and away from the leading end of the coupling of the plug main body, and the locking portion which is provided in the protruding manner below the leading end of the elastic side plate and inward inserted into the space portion formed in the coupling of the plug main body and the leading end of the spring push. As a result, the cap main body can be easily and securely installed to the plug main body only by a pressing operation of the protection cap.

The locking portion is formed into the flat surface so as to slide on the inner surface of the coupling leading end of the plug main body in its upper surface, and is formed in the lower surface the locking projection locking to and unlocking from the locking convex portion which is provided in the protruding manner in the leading end of the spring push of the plug main body. As a result, it is possible to smoothly perform the pressing operation of the cap main body.

The locking portion is formed into the thin plate shape so that the locking projection formed in the lower surface thereof is locked to the portion near the upper portion of the locking convex portion which is provided in the protruding manner in the leading end of the spring push. As a result, the cap main body is locked to the locking convex portion in the leading end of the spring push while maintaining a suitable retention force. Therefore, it is possible to smoothly and easily perform the pressing operation of the cap main body. Further, a retracting operation of the coupling is not necessary, and the cap main body can be easily and securely got out of the plug main body by simply pulling only by cap main body.

The locking portion is formed into the thick plate shape so that the locking projection formed in the lower surface thereof is locked to the lower portion of the locking convex portion which is provided in the protruding manner in the leading end of the spring push. As a result, the cap main body can be easily installed to the plug main body simultaneously performing the retracting operation of the coupling and the pressing insertion of the cap main body. Further, since the locking portion firmly engages with the locking convex portion in the leading end of the spring push on the basis of its large thickness, the locking portion can not be easily got out by pulling only the cap main body. Therefore, it is possible to securely prevent the cap main body from being carelessly detached during the use or at the transferring time of the plug main body.

The slit provided in the cap main body is formed into the narrow curved passage shape so that the outer wall surface side and the inner wall surface side of the cap main body are communicated. As a result, it is possible to make the intrusion of the dusts from the external portion through the slit as little as possible.

The loop-like cord hanging portion for hanging the cord for pulling in the piping is formed in the outer surface in the occluded leading end side of the cap main body. As a result, the plug main body can be arranged, for example, through an inner portion of an apartment and an underground piping, while protecting the ferrule by the cap main body.

BRIEF DESCRIPTION OF DRAWINGS

FIGS. 1A, 1B, 1C and 1D show an embodiment of a protection cap for carrying out the present invention, in which FIG. 1A is a front elevational view, FIG. 1B is a plan view, FIG. 1C is a back elevational view and FIG. 1D is a side elevational view;

FIGS. 3A and 3B show cross sectional views of the protection cap in the same way, in which FIG. 3A is a cross sectional view along a line B-B, and FIG. 3B is a cross sectional view along a line A-A;

FIGS. 4A and 4B show a state in which the protection cap in FIGS. 1A, 1B, 1C and 1D are attached to a plug main body, in which FIG. 4A is a plan view, and FIG. 4B is a side elevational view;

FIGS. 5A, 5B and 5C show cross sectional views of a state in which the protection cap in FIGS. 1A, 1B, 1C and 1D is attached to the plug main body in the same way, in which FIGS. 5A, 5B and 5C are explanatory views showing an example of a pull-away step in the case that the protection cap can be attached and detached only by an operation of the protection cap in a cross sectional view along a line I-I in FIG. 4B;

FIGS. 6A, 6B, 6C and 6D show the other example of the protection cap, in which FIG. 6A is a front elevational view, FIG. 6B is a plan view, FIG. 6C is a back elevational view, and FIG. 6D is a side elevational view;

FIGS. 8A and 8B show cross sectional views of the protection cap in the same way, in which FIG. 8A is a cross sectional view along a line Y-Y in FIG. 6D, and FIG. 8B is a cross sectional view along a line X-X in FIG. 6B;

FIGS. 9A and 9B show a state in which the protection cap in FIGS. 6A, 6B, 6C and 6D are attached to the plug main body, in which FIG. 9A is a plan view, and FIG. 9B is a side elevational view;

FIGS. 10A, 10B and 10C show cross sectional views of a state in which the protection cap in FIGS. 6A, 6B, 6C and 6D are attached to the plug main body in the same way, in which FIGS. 10A, 10B and 10C are explanatory views showing an example of the pull-away step according to the other example of getting out the protection cap after sliding the plug main body rearward;

FIGS. 11A and 11B are views for describing an intrusion route of the dusts, in which FIG. 11A is a cross sectional view along a line F-F in FIG. 9B, and FIG. 11B is a back elevational view of a half-cut state;

FIGS. 12A, 12B, 12C and 12D show an example in the case that a cord hanging portion is formed in the protection cap, in which FIG. 12A is a front elevational view, FIG. 12B is a plan view, FIG. 12C is a back elevational view, and FIG. 12D is a side elevational view;

FIGS. 14A and 14B show cross sectional views of the protection cap in which the cord hanging portion is formed in the same way, in which FIG. 14A is a cross sectional view along a line D-D in FIG. 12D, and FIG. 14B is a cross sectional view along a line C-C in FIG. 12C;

FIGS. 15A and 15B show a state in which the protection cap having the cord handing portion formed therein in the same way is attached to the plug main body, in FIG. 15A is a plan view, and FIG. 15B is a side elevational view;

FIGS. 18A, 18B, 18C and 18D show a structure of a protection cap according to the conventional example, in which FIG. 18A is a front elevational view, FIG. 18B is a plan view, FIG. 18C is a back elevational view, and FIG. 18D is a side elevational view;

FIG. 19 is a perspective view of the protection cap according to the conventional example;

FIGS. 20A and 20B show cross sectional views of the protection cap according to the conventional example, in which FIG. 20A is a cross sectional view along a line H-H in FIG. 18D, and FIG. 20B is a cross sectional view along a line G-G in FIG. 18B; and FIG. 21 is a transverse cross sectional view showing a state in which the protection cap according to the conventional example is attached to the plug main body.

MODES FOR CARRYING OUT THE INVENTION

Figure 2:
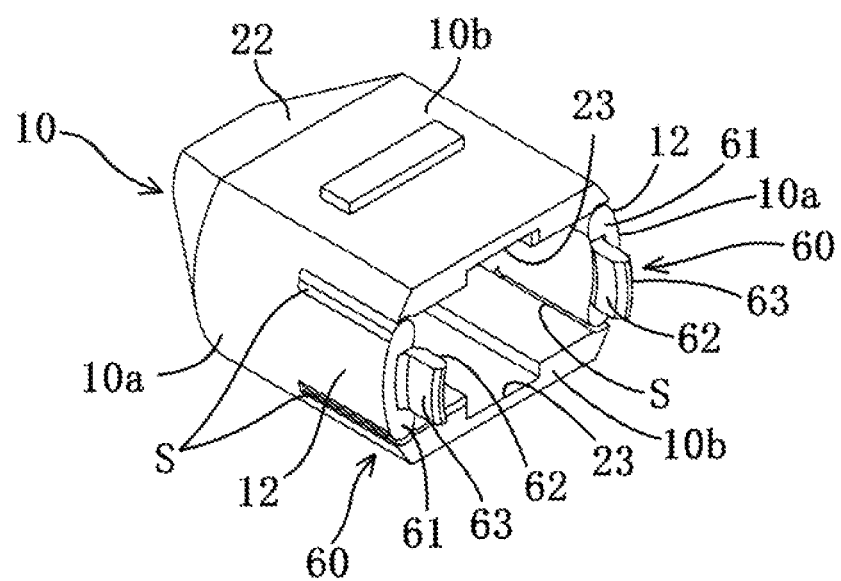
FIG. 2 is a perspective view of the protection cap in the same way.

A description will be in detail given below of an embodiment of a protection cap for an optical connector plug according to the present invention with reference to the accompanying drawings.

<Structure of Optical Connector Plug>

An optical connector plug according to the present invention is constructed by a plug main body 1 according to a so-called MPO type push-pull system having a ferrule 42 which is attached to a leading end of an optical fiber taper core wire FT, a sleeve-like spring push 41 which stores the ferrule 42 in a leading end thereof, a housing 48 which is installed to an outer periphery of the spring push 41, a tubular coupling 43 which is outward inserted to the housing 48 and is provided so as to be slidably in a movable range secured in an axial direction of the spring push 41, a spring 45 which is stored in an inner portion of the spring push 41 and elastically energizes the ferrule 42 to a front side of the optical connector, a spring 46 which is stored in a concave part 49 between the coupling 43 and the housing 48 and elastically energizes the coupling 43 to a front side of the housing 48, and a boot 44 which is attached to an opposite rear end portion to the front end where the ferrule 42 of the spring push 41 is provided, as shown in FIGS. 4A, 4B, 5A, 5B, 5C, 9A, 9B, 10A, 10B, 10C, and 16.

<Structure of Protection Cap>

The protection cap for the optical connector plug according to the present invention is constructed by a cap main body 10 which is installed to the spring push 41 so as to cover the leading end side of the ferrule 42 and is formed into an approximately rectangular tubular shape for protecting the end surface of the ferrule 42, as shown in FIGS. 1A, 1B, 1C, 1D, 2, 3A, 3B, 4A, 4B, 5A, 5B and 5C. The cap main body 10 is formed by an occluded portion 22 having a truncated approximately rectangular pyramidal shape in a leading end side, is formed into an approximately rectangular tubular shape by right and left side plates 10 a each having a narrow circular arc shape and upper and lower side plates 10 b each having a wide flat shape in a rear end side, and is structured such that the ferrule 42 of the plug main body 1 is stored from a rear end opening portion and is inserted into and attached to the spring push 41. In this connection, the narrow circular-arc shaped sides are called as the right and left side plates 10 a, and the wide flat sides are called as the upper and lower side plates 10 b in the present description (same applies to the below), however, the upper and lower and the right and left may be replaced and displayed.

A pair of slits S are provided at upper and lower positions of the right and left side plates 10a of the cap main body 10 (or right and left positions of the upper and lower side plates 10b) from an opening end of the cap main body 10 toward an inner side, and a pair of right and left elastic side plates 12 are formed so as to be arranged in an opposed manner to be bendable in a cantilever manner via the slits S. More specifically, the elastic side plate 12 constructs a part of the right and left side plates 10a (or the upper and lower side plates 10b) of the cap main body 10. In other words, the elastic side plate 12 is not constructed as a separated body (a double-layer structure) from the cap main body 10.

As shown in FIGS. 1C, 3A, 3B, 5A, 5B, 50, 60, 8A, 8B, 10A, 10B, 100, 12C, 14A, 14B and 16, a cover portion 11 having an approximately rectangular tubular frame shape is formed in an inner side of the occluded portion 22 of the cap main body 10. When the cap main body 10 is occluded on the plug main body 1 and a locking mechanism 60 mentioned later is locked to the spring push 41, an end surface of the ferrule 42 of the plug main body 1 is protected by the cover portion 11 in a non-contact state.

<Structure of Locking Mechanism>

As shown in FIGS. 2, 3A, 3B, 5A, 5B, 5C, 7, 8A, 8B, 10A, 10B, 100, 14A, 14B and 16, the locking mechanism 60 is formed in a leading end of the elastic side plate 12, the locking mechanism 60 protruding out of an opening portion in a rear end of the cap main body 10 and being capable of engaging with and disengaging from the spring push 41 of the plug main body 1. The locking mechanism 60 is provided with a vertical contact surface portion 61 which is formed above the leading end of the elastic side plate 12 and comes close to and away from a leading end surface of the coupling 43 of the plug main body 1, and a locking portion 63 which is provided in a protruding manner below the leading end of the elastic side plate 12 and is inward inserted detachably into a space portion V which is formed by the coupling 43 of the plug main body 1 and the leading end of the spring push 41.

The locking portion 63 is formed into a flat surface so that an upper surface slides on an inner surface in the leading end of the coupling 43 of the plug main body 1, and is formed in a lower surface a locking projection 62 which is engaged with and disengaged from a locking convex portion 50 which is provided in a protruding manner in the leading end of the spring push 41 of the plug main body 1 via a catch portion 2. Further, as shown in FIGS. 3A, 5A, 5B and 5C, the locking portion 63 is formed with a thickness L1 like a thin plate in such a manner that the locking projection 62 is locked to a portion close to an upper portion of a locking convex portion 50 which is provided in a protruding manner in the leading end of the spring push 41 (shown by reference symbol L1 in FIG. 3A).

Next, a description will be given of an example of a use and a motion of the embodiment structured as mentioned above with reference to FIGS. 5A, 5B and 5C.

As shown in FIG. 5C, in the case that the cap main body 10 is inserted into the leading end side of the spring push 41 of the plug main body 1, the locking portion 63 of the locking mechanism 60 provided in the leading end of the elastic side plate 12 is fitted and inserted via the space portion V of the spring push 41 and the coupling 43 as shown in FIG. 5B. Further, as shown in FIG. 5A, the locking projection 62 is engaged with the catch portion 2 of the spring push 41 via the locking convex portion 50, and the vertical contact surface portion 61 is brought into contact with the leading end surface of the coupling 43. At this time, since the locking portion 63 in the illustrated example is formed into the thin plate shape with the thickness L1 as shown in FIG. 3A, the locking projection 62 is locked to the portion close to the upper portion of the locking convex portion 50 which is provided in a protruding manner in the leading end of the spring push 41.

When pulling away the cap main body 10, the locking projection 62 of the locking portion 63 engaged with the catch portion 2 of the spring push 41 easily climbs over the locking convex portion 50 only by pulling the cap main body 10, as shown in FIGS. 5A and 5B. Further, as shown in FIG. 5C, the locking projection 62 is released from the space portion V of the spring push 41 and the coupling 43.

Figure 3A:
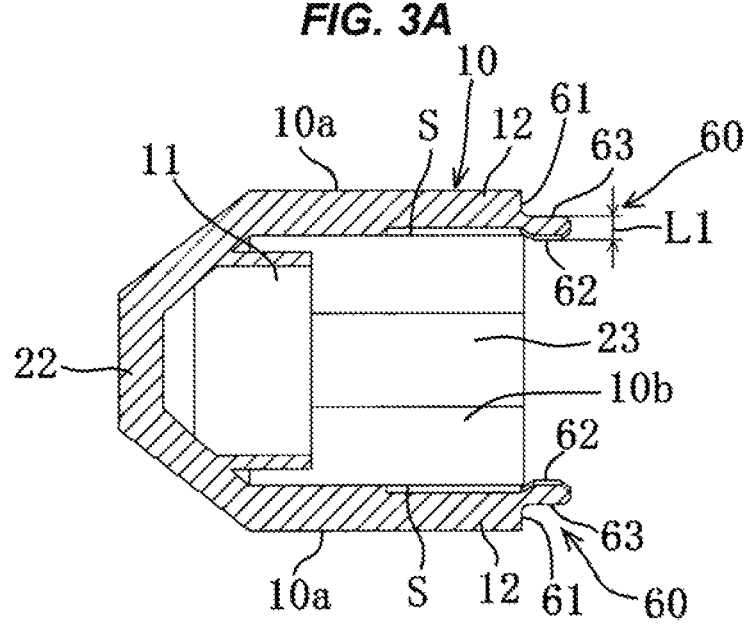
Figure 3B:
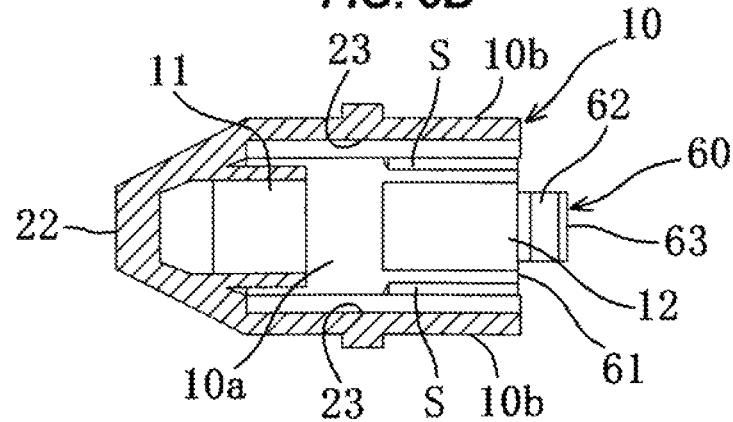
Figure 7:
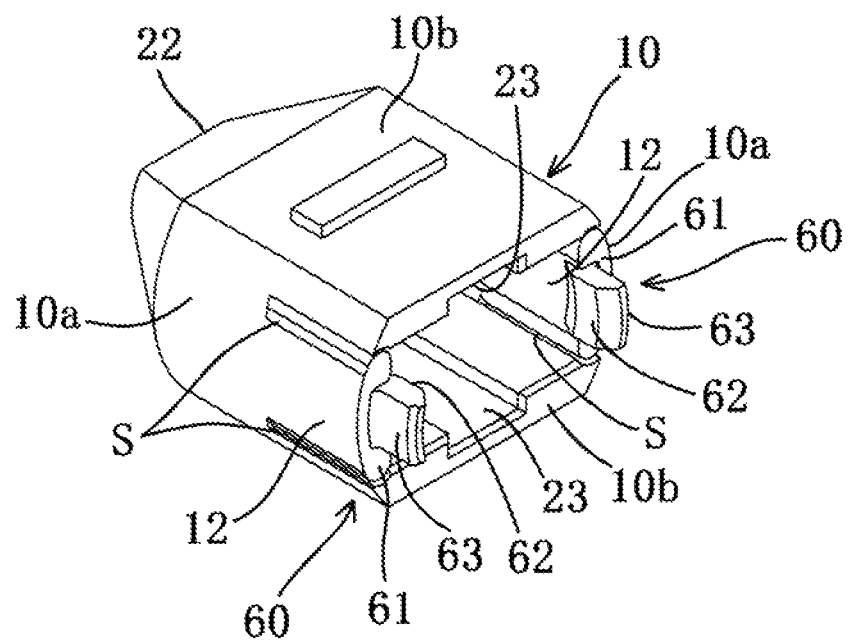
FIG. 7 is a perspective view of the protection cap in the same way.

As mentioned above, since the locking portion 63 is formed into the thin plate shape with the thickness L1 as shown in FIG. 3A, the cap main body 10 is locked to the locking convex portion 50 in the leading end of the spring push 41 while maintaining an appropriate (minimum) retention force. Therefore, it is possible to smoothly and easily carry out the operation for pressing the cap main body 10. Accordingly, the locking projection 62 can easily climb over the locking convex portion 50 and can be pulled away, and the cap main body 10 can be easily pulled away from the plug main body 1 only by the operation for pulling the cap main body 10, without sliding the coupling 43 rearward.

<Modified Example of Locking Mechanism>

Next, a description will be given in detail of a modified example of the locking mechanism 60 with reference to FIGS. 6A, 6B, 6C, 6D, 7, 8A, 8B, 9A, 9B, 10A, 10B, 10C, 11A and 11B.

In this modified example, the same reference numerals are attached to the same portions as the present embodiment, and a description thereof will be appropriately omitted or simplified. In this connection, FIGS. 9A and 9B are the same as FIGS. 4A and 4B in an outer appearance, however, the locking projection 62 of the locking portion 63 of the plug main body 1 stored in the inner portion is formed into the thin plate shape in FIGS. 4A and 4B, and the locking projection 62 of the locking portion 63 of the plug main body is on the contrary formed into the thick plate shape in FIGS. 9A and 9B.

The present modified example is structured such that the cap main body 10 is pulled away from the plug main body 1 by first sliding the coupling 43 rearward.

Figure 8A:
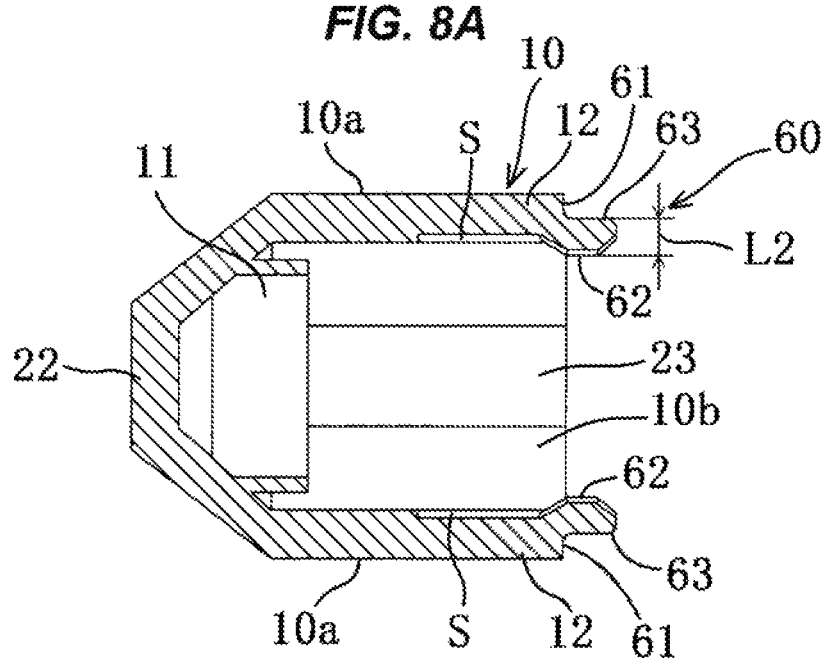
Figure 8B:
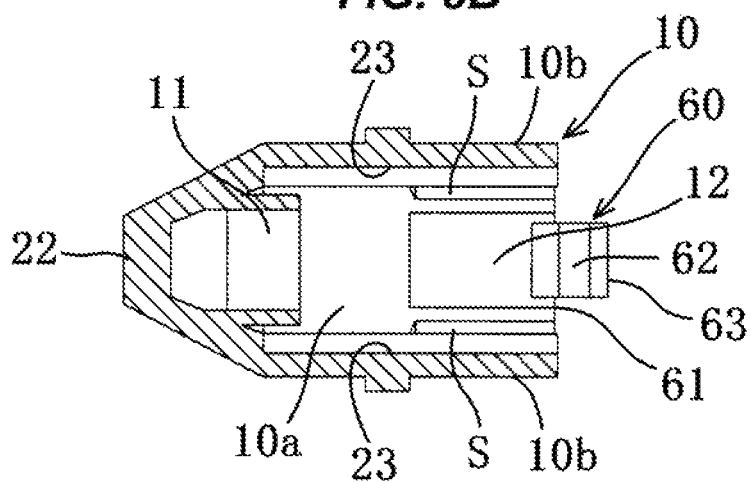
Figure 11A:
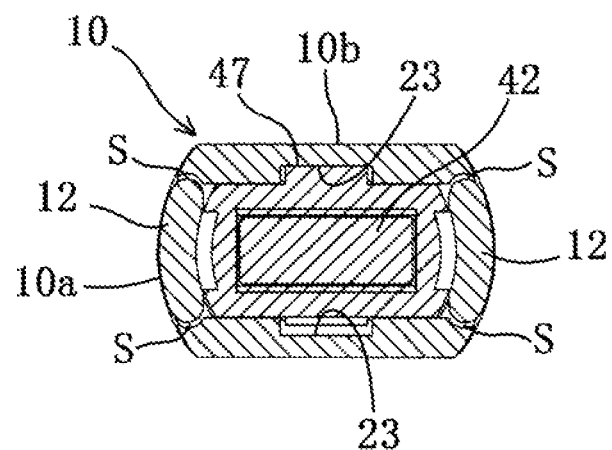
Figure 11B:
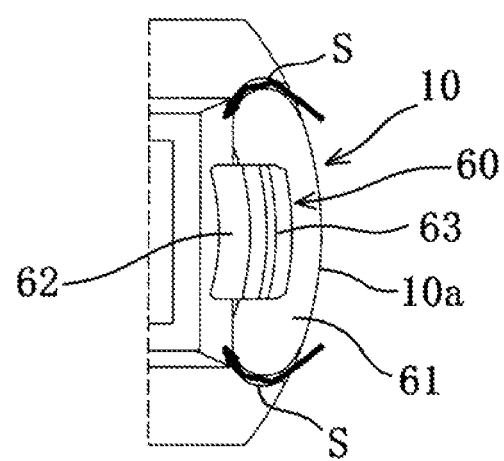
Figure 13:
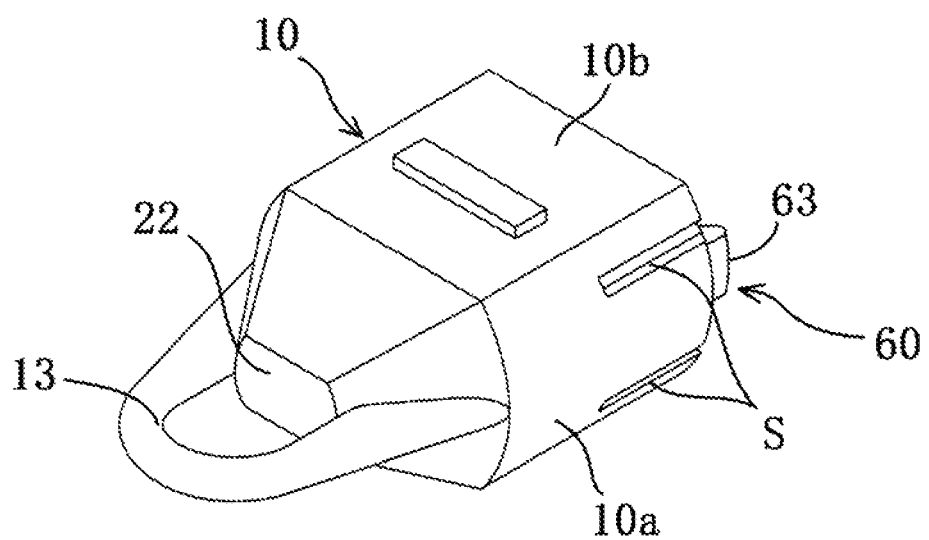
FIG. 13 is a perspective view of the protection cap in which the cord hanging portion is formed in the same way.
Figure 14A:
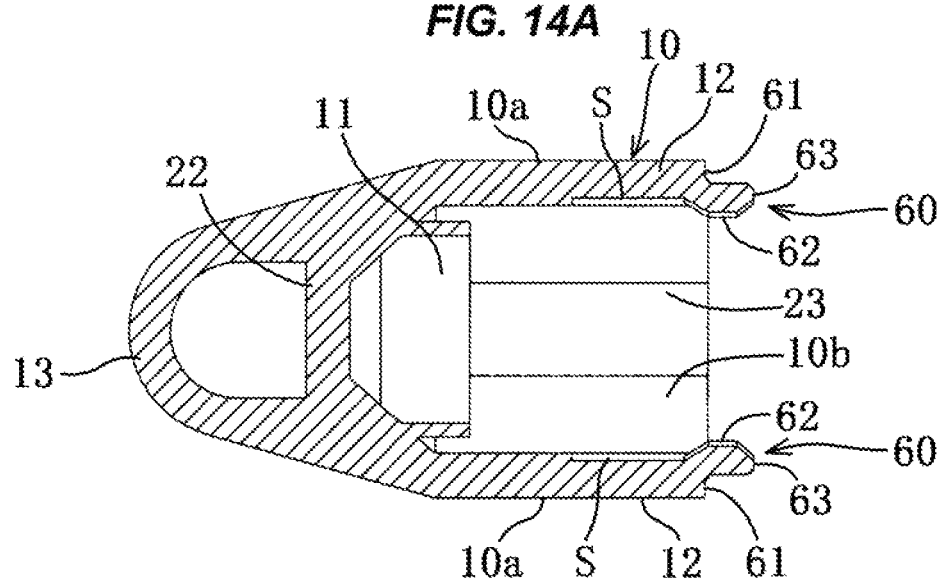
Figure 14B:
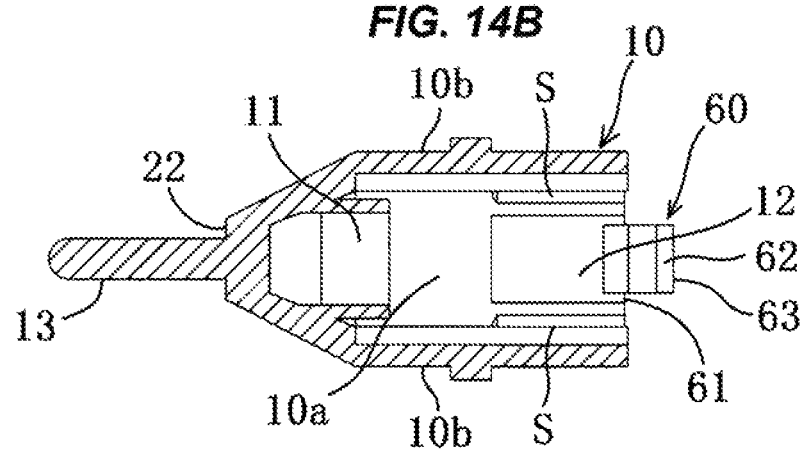

More specifically, as shown in FIG. 8A, the locking portion 63 is formed into a thick plate shape with a thickness L2 so that the locking projection 62 formed in a lower surface thereof firmly eats into the lower portion of the locking convex portion 50 which is provided in a protruding manner in the leading end of the spring push 41 via the catch portion 2 and is locked thereto.

In the case that the cap main body 10 is inserted into the leading end side of the spring push 41 of the plug main body 1 as shown in FIG. 10C when using the cap main body 10, the leading end surface of the coupling 43 is pressed and temporarily moved rearward as shown in FIG. 10B by the pressing motion of the locking portion 63 of the locking mechanism 60 provided in the leading end of the elastic side plate 12. Further, after the locking projection 62 of the locking portion 63 climbs over the locking convex portion 50 which is provided in a protruding manner in the leading end of the spring push 41 of the plug main body 1 via the catch portion 2, the locking projection 62 is engaged with the catch portion 2 as shown in FIG. 10A. Finally, since the coupling 43 is normally energized to the front side of the housing 48 by the spring 46 as shown in FIGS. 4A and 4B, the coupling 43 is slidably returned forward, and the leading end of the coupling 43 comes into contact with the vertical contact surface portion 61 of the locking mechanism 60. As a result, the outer surface of the locking portion 63 is covered with and retained by the inner surface of the leading end of the coupling 43 (refer to FIGS. 4A, 4B and 16).

When pulling away the cap main body 10, the coupling 43 is slid rearward in a state in which the locking projection 62 is engaged with the catch portion 2. At this time, the catch 2 in a state in which the locking projection 62 is engaged with the catch portion 2 is exposed as shown in FIG. 10A. Further, as shown in FIG. 10B, the locking projection 62 engaged with the catch portion 2 of the spring push 41 climbs over the locking convex portion 50 by pulling away the cap main body 10. Further, as shown in FIG. 10C, the coupling 43 slidably returns forward and the leading end of the coupling 43 closes the catch portion 2 at the same time that the locking projection 62 is released from the space portion V of the spring push 41 and the coupling 43. In this connection, the space portion V is desirably set a space portion width to be slightly greater than that of the space portion used by the protection cap having the thin plate shaped locking portion.

<Modified Example of Protection Cap>

Next, a description will be given in detail of a modified example of the cap main body 10 with reference to FIGS. 12A, 12B, 12C, 12D, 13, 14A, 14B, 15A, 15B, 16 and 17. In this modified example, the same reference numerals are attached to the same portions as those of the present embodiment, and a description thereof will be appropriately omitted or simplified.

Figure 17:
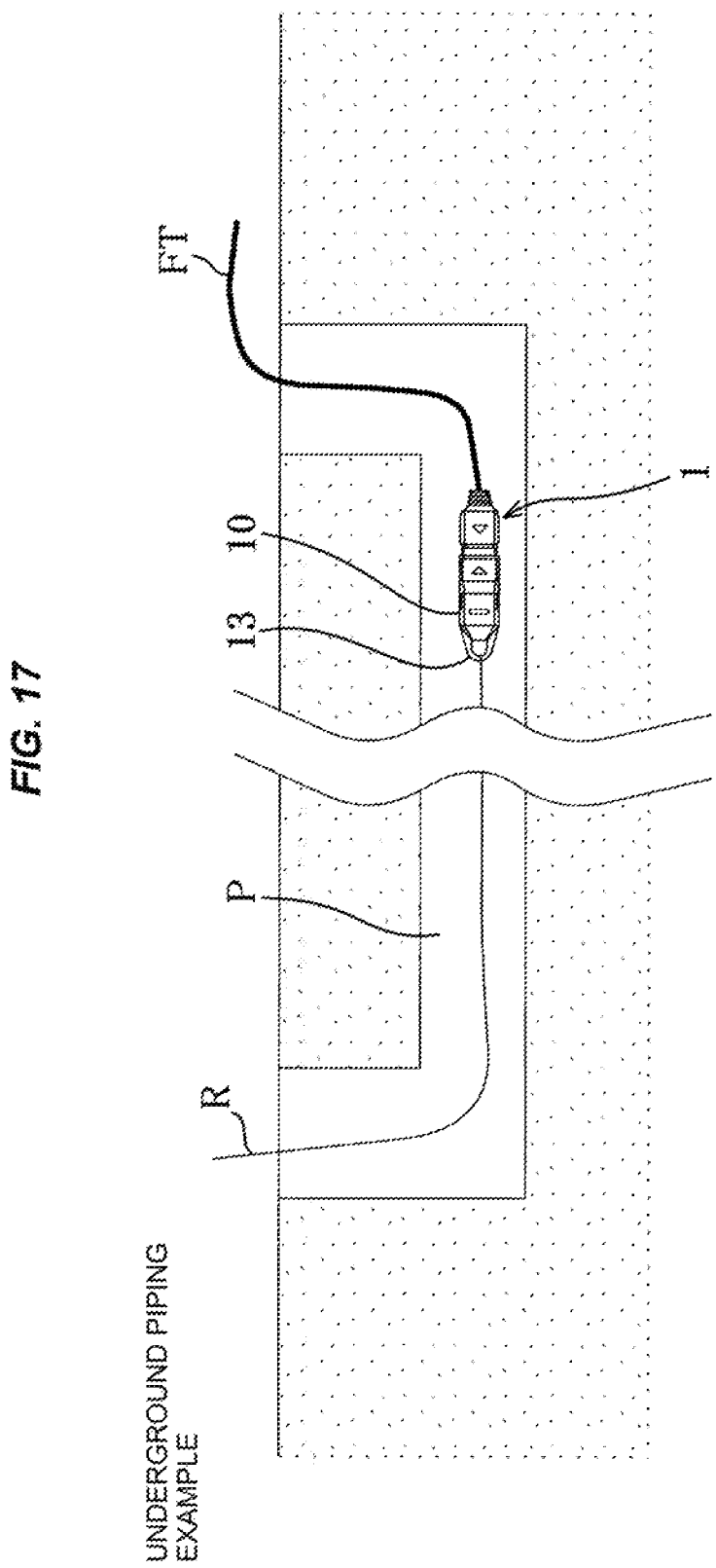
FIG. 17 is an explanatory view showing a specific used example for an underground piping.
Figure 20A:
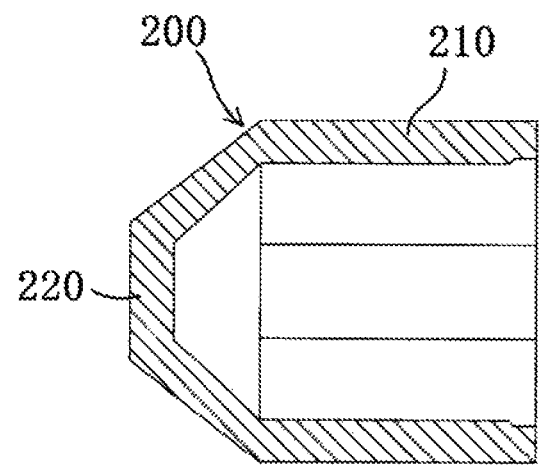
Figure 20B:
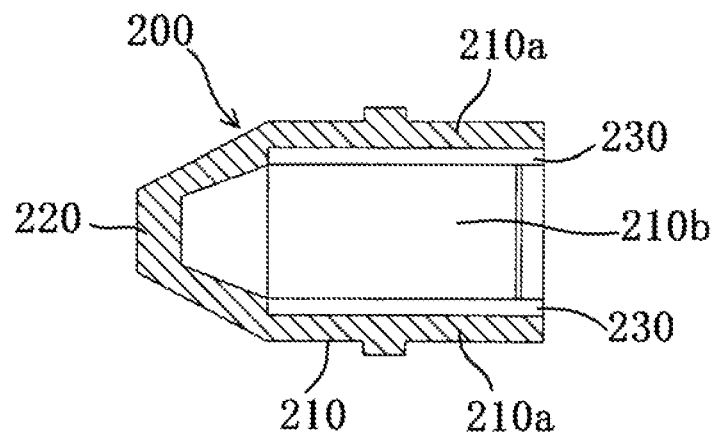

In this modified example, as shown in FIGS. 12A, 12B, 12C, 12D, 13, 14A and 14B, a loop-shaped cord hanging portion 13 is formed on an outer surface in the leading end side of the occluded portion 22 of the cap main body 10 for hanging a cord R, for example, for pulling in a piping P shown in FIG. 17.

Figure 16:
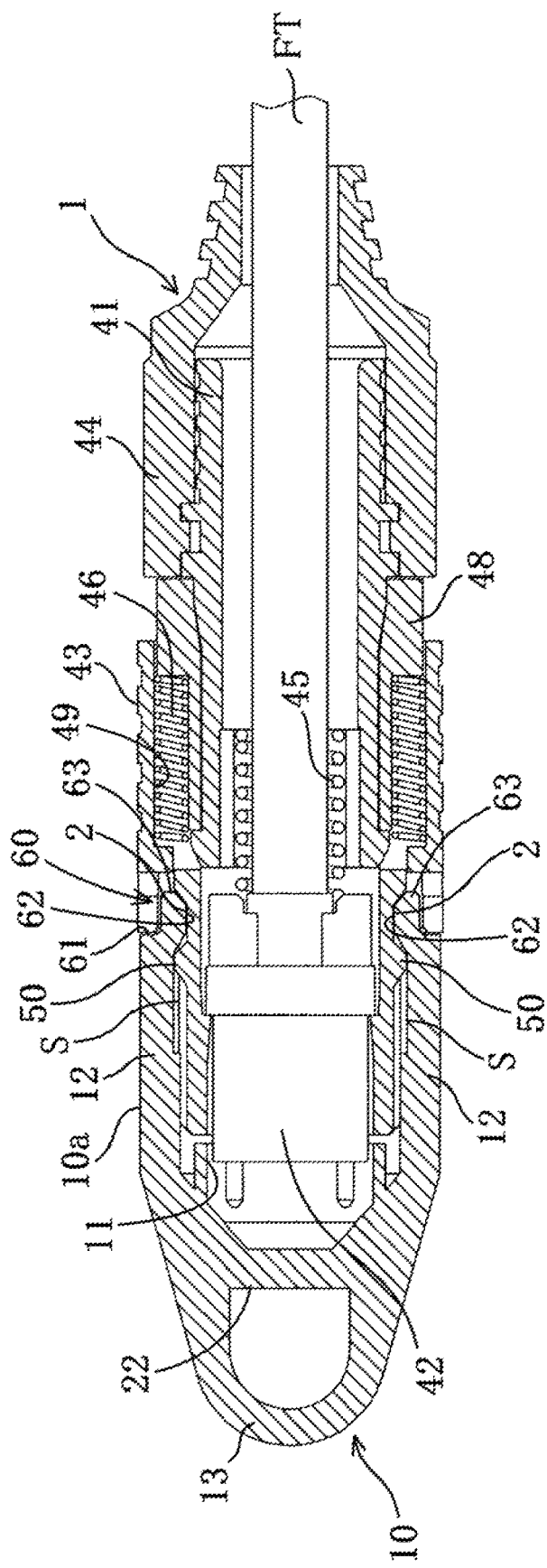
FIG. 16 shows a cross sectional view of a state in which the protection cap is attached to the plug main body in the same way, and is a cross sectional view along a line E-E in FIG. 15B.

As shown in FIGS. 15A, 15B and 16, the cord R is passed to and fastened to the cord hanging portion 13 after the cap main body 10 is inserted into the leading end side of the spring push 41 of the plug main body 1. Accordingly, the plug main body 1 can be pulled in while the cap main body 10 being attached within the inner portion of the piping P by towing the cord R, as shown in FIG. 17.

In this modified example, since the plug main body 1 is pulled in via the cap main body 10, the locking portion 63 is used in the type of being formed into the thick plate shape with the thickness L2 so that the locking projection 62 formed in the lower surface of the locking portion 63 firmly eats into the lower portion of the locking convex portion 50 provided in a protruding manner in the leading end of the spring push 41 of the plug main body 1 via the catch portion 2, as shown in FIG. 8A, in such a manner as to prevent the cap main body 10 from being detached from the plug main body 1. More specifically, the locking portion 63 can not be used in the type that the locking projection 62 of the locking portion 63 is formed into the thin plate shape as shown in FIG. 3A, and the locking projection 62 can be got out only by getting out the cap main body 10 which is thin engaged with the locking convex portion 50 of the spring push 41.

Therefore, in the above embodiments, the slit S is formed into the narrow curved passage shape so that the outer wall surface side and the inner wall surface side of the cap main body 10 are communicated for making the intrusion of the dusts from the external portion as little as possible. This means that the right and left elastic side plates 10a and 10a are formed by a plate member having a shape of being outward curved into a circular arc shape, and the slits S formed in the upper and lower positions of the elastic side plates 10a and 10b are also formed into the curved passage shape along the plate members having this shape. However, the right and left elastic side plates 10a and 10b may be both formed by the vertical plate member, and the slits S having the narrow straight passage shape may be formed along the plate members having this shape. Since the straight passage shaped slit S is narrow, the slit S can prevent the intrusion of the dusts in the plug main body 10. The slit S in the present invention includes the shapes of the both. It goes without saying that same applies to the case that the slits S are formed in both the right and left sides of the flat upper and lower side plates 10b and 10b.

EXPLANATION OF LETTERS OR NUMERALS

FT optical fiber tape core wire
S slit
V space portion
R cord
P piping
L1, L2 thickness
1 plug main body
2 catch portion
10 cap main body
10a right and left side plates
10b upper and lower side plates
11 cover portion
12 elastic side plates
13 cord hanging portion
22 occluded portion
23 key groove
41 spring push
42 ferrule
43 coupling
44 boot
45, 46 springs
48 housing
49 concave part
50 locking protrusion portion
60 locking mechanism
61 vertical contact surface portion
62 locking projection
63 locking portion
200 protection cap
210 cap main body
210a upper and lower side plate portions
210b right and left side plate portions
220 occluded portion
230 key groove
240 rib

The invention claimed is:

1. A protection cap for covering a leading end of a spring-biased ferrule slidably received in a push sleeve containing a spring and situated in a plug main body of an optical connector, the ferrule being biased by the spring to extend axially from a leading end of the plug main body, wherein said protection cap comprises:
   a cap main body having a leading end side formed by an occluded portion which is formed into a truncated approximately rectangular pyramid shape, and a rear end side formed by right and left side plates and upper and lower side plates that collectively form an approximately rectangular tubular shape so that the ferrule of said plug main body is received in a rear end opening portion of the cap main body, and
   wherein a pair of slits are provided at upper and lower positions of the right and left side plates or right and left positions of the upper and lower side plates of said cap main body from an opening end of the cap main body toward the occluded portion so that the right and left side plates or the upper and lower side plates are elastically deformable in an outward direction with respect to the cap main body,
   wherein a locking mechanism extends axially from an opening portion in a rear end of said cap main body to lock the cap main body to the push sleeve of said plug main body, the locking mechanism being formed in a leading end of said elastically deformable side plates to engage surfaces of the push sleeve and therefore removably lock the protection cap to the plug main body when the cap main body is positioned over the leading end of the plug main body, and
   wherein a cover portion having an approximately rectangular tubular shape is formed in an inner side of the occluded portion of said cap main body so that a ferrule end surface of said plug main body is locked and retained in a non-contact state when said locking mechanism is locked to said push sleeve.

2. The protection cap for the optical connector plug according to claim 1, wherein said locking mechanism is provided with a vertical contact surface portion which is formed above the leading end of said elastic side plate and comes close to and away from the leading end of a coupling of said plug main body, and a locking portion which is provided in a protruding manner below the leading end of said elastic side plate and inward inserted into a space portion formed in the coupling of said plug main body and the leading end of the push sleeve.

3. The protection cap for the optical connector plug according to claim 2, wherein said locking portion is formed into a flat surface so as to slide on an inner surface of the coupling leading end of said plug main body in its upper surface, and is formed in a lower surface a locking projection locking to and unlocking from a locking convex portion which is provided in a protruding manner in a leading end of the push sleeve of said plug main body.

4. The protection cap for the optical connector plug according to claim 2, wherein said locking portion is formed into a thin plate shape so that a locking projection formed in a lower surface thereof is locked to a portion near the upper portion of the locking convex portion which is provided in a protruding manner in the leading end of said push sleeve.

5. The protection cap for the optical connector plug according to claim 2, wherein said locking portion is formed into a thick plate shape so that a locking projection formed in a lower surface thereof is locked to a lower portion of a locking convex portion which is provided in a protruding manner in the leading end of said push sleeve.

6. The protection cap for the optical connector plug according to claim 2, wherein a loop-like cord hanging portion for hanging a cord for pulling in a piping is formed in an outer surface in the occluded leading end side of said cap main body.

7. The protection cap for the optical connector plug according to claim 1, wherein said locking portion is formed into a flat surface so as to slide on an inner surface of the coupling leading end of said plug main body in its upper surface, and is formed in a lower surface a locking projection locking to and unlocking from a locking convex portion which is provided in a protruding manner in a leading end of the push sleeve of said plug main body.

8. The protection cap for the optical connector plug according to claim 7, wherein said locking portion is formed into a thin plate shape so that a locking projection formed in a lower surface thereof is locked to a portion near the upper portion of the locking convex portion which is provided in a protruding manner in the leading end of said push sleeve.

9. The protection cap for the optical connector plug according to claim 7, wherein said locking portion is formed into a thick plate shape so that a locking projection formed in a lower surface thereof is locked to a lower portion of a locking convex portion which is provided in a protruding manner in the leading end of said push sleeve.

10. The protection cap for the optical connector plug according to claim 7, wherein a loop-like cord hanging portion for hanging a cord for pulling in a piping is formed in an outer surface in the occluded leading end side of said cap main body.

11. The protection cap for the optical connector plug according to claim 1, wherein said locking portion is formed into a thin plate shape so that a locking projection formed in a lower surface thereof is locked to a portion near the upper portion of the locking convex portion which is provided in a protruding manner in the leading end of said push sleeve.

12. The protection cap for the optical connector plug according to claim 1, wherein said locking portion is formed into a thick plate shape so that a locking projection formed in a lower surface thereof is locked to a lower portion of a locking convex portion which is provided in a protruding manner in the leading end of said push sleeve.

13. The protection cap for the optical connector plug according to claim 1, wherein the slit provided in said cap main body is formed into a narrow curved passage shape so that an outer wall surface side and an inner wall surface side of the cap main body are in contact.

14. The protection cap for the optical connector plug according to claim 1, wherein a loop-like cord hanging portion for hanging a cord for pulling in a piping is formed in an outer surface in the occluded leading end side of said cap main body.

\* \* \* \* \*